US012384143B2

(12) United States Patent
Poncet et al.

(10) Patent No.: US 12,384,143 B2
(45) Date of Patent: Aug. 12, 2025

(54) PUNCHING DIE FOR PUNCHING MACHINE

(71) Applicant: Illinois Tool Works Inc., Glenview, IL (US)

(72) Inventors: Denis Poncet, Oyonnax (FR); Nicolas Pradines, Samognat (FR)

(73) Assignee: ILLINOIS TOOL WORKS INC., Glenview, IL (US)

( * ) Notice: Subject to any disclaimer, the term of this patent is extended or adjusted under 35 U.S.C. 154(b) by 0 days.

(21) Appl. No.: 18/569,091

(22) PCT Filed: Jun. 10, 2022

(86) PCT No.: PCT/IB2022/000361
§ 371 (c)(1),
(2) Date: Jan. 4, 2024

(87) PCT Pub. No.: WO2022/259043
PCT Pub. Date: Dec. 15, 2022

(65) Prior Publication Data
US 2024/0278551 A1 Aug. 22, 2024

(51) Int. Cl.
*B41F 19/06* (2006.01)
*B41F 16/00* (2006.01)

(52) U.S. Cl.
CPC ...... *B41F 16/0066* (2013.01); *B41P 2219/31* (2013.01); *B41P 2219/33* (2013.01)

(58) Field of Classification Search
None
See application file for complete search history.

(56) References Cited

U.S. PATENT DOCUMENTS

| | | | | |
|---|---|---|---|---|
| 3,817,172 | A * | 6/1974 | Horton | H05B 3/02 101/31 |
| 10,737,413 | B1 | 8/2020 | Stevenson et al. | |
| 2018/0311997 | A1 | 11/2018 | Triepel et al. | |
| 2021/0008867 | A1 | 1/2021 | Roeder et al. | |

FOREIGN PATENT DOCUMENTS

| | | | |
|---|---|---|---|
| FR | 2733179 | A1 | 10/1996 |

OTHER PUBLICATIONS

Bluesil RTV 3428 A & B technical data sheet, Jul. 2014. (Year: 2014).*

(Continued)

*Primary Examiner* — Leslie J Evanisko
(74) *Attorney, Agent, or Firm* — The Small Patent Law Group LLC; Christopher R. Carroll

(57) ABSTRACT

A die is provided for printing through a print carrier onto an object in a hot stamping machine. The die comprises a first layer of a first material, hereinafter referred to as the base layer, the hardness of which is less than 50 shore A measured according to ISO 868 or DIN 53505, and the thickness of which is greater than 20 mm. The die includes a second layer of a second material, hereinafter referred to as the printing layer, the hardness of which is greater than 50 shore A measured according to ISO 868 or DIN 53505, and the thickness of which is less than 5 mm. The second layer is intended to be in contact with the print carrier.

9 Claims, 3 Drawing Sheets

(56) References Cited

OTHER PUBLICATIONS

International Search Report and Written Opinion mailed Nov. 14, 20233 for corresponding PCT Application No. PCT/IB2022/000361 (14 pages).
International Preliminary Report on Patentability mailed Dec. 21, 2023 for corresponding PCT Application No. PCT/IB2022/000361 (18 pages).
ISO 868, "Plastics and ebonite—Determination of indentation hardness by means of a durometer (Shore hardness)" ISO 2003 (3 pages).
Deutsche Norm, "DIN 53505", Aug. 2000 (5 pages).
ASTM D2240, "Standard Test Method for Rubber Property—Durometer Hardness" ASTM Int'l, Tue May 9, 2013 (13 pages).

* cited by examiner

PUNCHING DIE FOR PUNCHING MACHINE

TECHNICAL FIELD

The present invention generally relates to hot stamping, particularly hot-stamping machines. More specifically, though not exclusively, this invention relates to a die for a hot stamping machine.

PRIOR ART

Document FR-A1-2 733 179 describes a printing machine such as a gilding press or hot stamping machine. A machine of this type comprises a heating block that has a curved surface for holding a printing plate, an applicator head that has means for guiding the heating block by tilting it in a plane PX, and an actuator for tilting the heating block relative to the applicator head.

The plate or die comprises an embossed pattern corresponding to that of the desired print. This plate may be a solid die for "overall coloring" of the surface to be decorated. The die is heated by the heating block and enables a carrier such as a foil, ribbon, etc. to be applied with a certain pressure to the object to be printed. This carrier comprises a carrier layer and a transfer layer, the latter being intended to be partially transferred from the carrier layer to the object to be printed according to the pattern of the plate.

In the aforementioned document, the actuator is a pneumatic cylinder whose body is mounted on the application head and is hinged around an axis that is perpendicular to the tilt plane of the heating block (namely, a horizontal or vertical axis). The piston of the cylinder is hinged around another horizontal or vertical axis at one end of an arm that is attached at its opposite end to the heating block. Moving the piston causes the heating block to tilt, on one hand, and the cylinder to pivot relative to the applicator head, on the other.

The die typically comprises a first layer, hereinafter referred to as the metal base layer, that transfers heat from the heating block to the carrier and transfers pressure from the actuator to the carrier and to the object to be stamped, thereby enabling the stamping to take place. The die also comprises a second silicone layer that carries the relief (or pattern) to be stamped on the object. This second layer is flexible and therefore absorbs part of the pressure to avoid damaging the object to be printed. As it is less thermally conductive than metal, it also ensures that no excessive temperature is applied to the object. However, it must remain thin so as not to excessively limit the heating of the carrier to carry out the stamping.

However, this typical die cannot be used for hot stamping on objects with complex geometries, such as perfume bottles, due to the die's lack of flexibility or deformability.

It would therefore be advantageous to provide a die that alleviates the problems of the known systems and, in particular, enables hot stamping to be carried out on objects with complex geometries.

SUMMARY OF THE INVENTION

The present invention provides a simple, effective and economical solution to at least some of these problems.

The invention relates to a die for printing through a print carrier onto an object in a hot stamping machine, characterized in that the die comprises a first layer of a first material, hereinafter referred to as the base layer, the hardness of which is less than 50 shore A measured according to ISO 868 or DIN 53505, and the thickness of which is greater than 20 mm, and a second layer of a second material, hereinafter referred to as the printing layer, the hardness of which is greater than 50 shore A measured according to ISO 868 or DIN 53505, and the thickness of which is less than 5 mm, the second layer being intended to be in contact with the print carrier. For the purposes of this invention, the thickness of a die layer is defined as the dimension along the axis perpendicular to the plane of contact between the die and the object to be printed, if the die and object are flat, or along the axis perpendicular to the plane tangential to the point or line of contact between the die and the object to be printed, if the die and/or object are not flat. For a layer whose thickness varies over its surface, for example, the thickness corresponds to the maximum thickness measured over the surface of the layer. It may also correspond to the minimum thickness measured over the surface of the layer.

The invention thus enables hot stamping to be carried out on objects with complex geometries, due to the presence of the first layer, which has a hardness of less than 50 shore A measured according to the ASTM D2240 test method, and which is therefore flexible enough to enable the die to deform in order to adapt to said geometry when the actuator applies pressure to the die. The second layer is sufficiently hard to ensure that the pattern to be printed is not distorted. Such a die thus makes it possible to supply heat for hot stamping while keeping this heat within the working area of the die (which is the second layer) and to ensure flexibility in order to adapt to the shape of the objects and facilitate the application of the carrier.

According to an advantageous embodiment of the invention, the first material has a hardness comprised between 10 and 40 shore A measured according to ISO 868 or DIN 53505, and a thickness comprised between 30 mm and 60 mm.

According to an exemplary embodiment of the invention, the second material has a hardness comprised between 60 and 90 shore A measured according to ISO 868 or DIN 53505, and a thickness comprised between 1 mm and 3 mm.

According to an advantageous embodiment of the invention, the first material is an RTV (Room-Temperature Vulcanizing) silicone.

According to an advantageous embodiment of the invention, the second material is an HTV (High-Temperature Vulcanizing) silicone.

According to an advantageous embodiment of the invention, the first material is Bluesil RTV 3428 silicone.

According to an advantageous embodiment of the invention, the second material is one of Thermosil and Ultrasil silicones.

According to an exemplary embodiment of the invention, the printing layer is intended to be heated by radiation or by contact with a hot surface. For example, infrared heating may be used.

According to an exemplary embodiment of the invention, the die comprises a mounting bracket for attachment to the hot stamping machine.

According to an exemplary embodiment of the invention, the mounting bracket is made of dural.

The invention also relates to a hot stamping machine comprising a die as previously described.

According to an exemplary embodiment of the invention, the machine comprises a print carrier on which one or more object(s) to be stamped can be installed.

For the avoidance of doubt, all the features described herein also apply to any aspect of the invention.

As part of this application, it is expressly provided that the various aspects, embodiments, examples and alternatives disclosed in the preceding paragraphs, in the claims and/or in the following description and drawings, and in particular the individual features thereof, may be taken separately or in any combination. In other words, all embodiments and/or features of any embodiment may be combined in any way, unless these features are incompatible.

For the avoidance of doubt, the terms “can”, “and/or”, “for example”, “for example” [sic: repeated expression] and any other similar term used herein must be interpreted as not limiting, such that any feature described herein is not necessarily required to be present. Indeed, any combination of optional features is expressly foreseen without departing from the scope of the invention, whether or not they are expressly claimed. The applicant reserves the right to amend any claim originally filed or to file any new claim accordingly, including the right to amend any claim originally filed to depend on and/or incorporate any feature of any other claim, though it is not originally claimed in this manner.

BRIEF DESCRIPTION OF THE DRAWINGS

Some embodiments of the invention will now be described by way of example only, with reference to the attached drawings in which.

DETAILED DESCRIPTION

Figure 1:
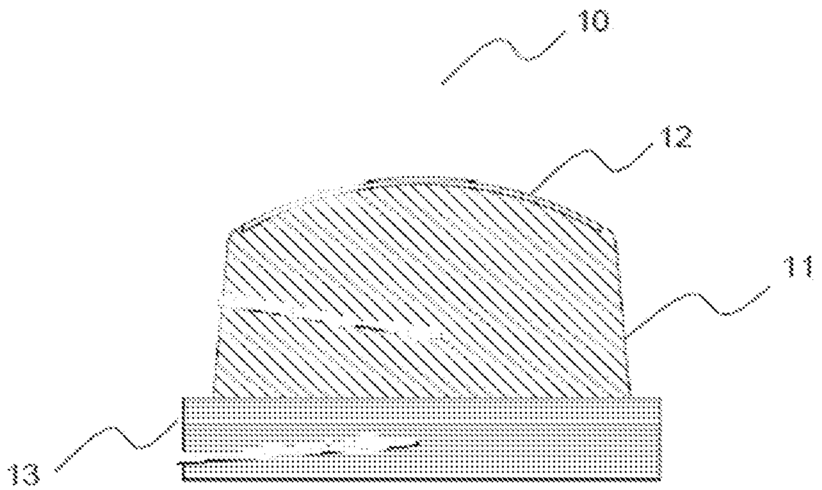
FIG. 1 is a cross-sectional view of a die according to an exemplary and advantageous embodiment of the invention.

FIG. 1 illustrates a cross-sectional view of a die 10 for printing through a print carrier onto an object in a hot stamping machine according to an exemplary and advantageous embodiment of the invention. Such a die 10 comprises a first layer 11 of a first material that is, for example, a room-temperature vulcanizing (RTV) silicone, such as Bluesil RTV 3428 silicone, for example.

This first layer will be referred to hereinafter as the base layer 11. For example, the hardness of the base layer 11 is less than 50 shore A measured according to ISO 868 or DIN 53505 and its thickness is greater than 20 mm. Advantageously, the first material has a hardness comprised between 10 and 50 shore A measured according to ISO 868 or DIN 53505, and a thickness comprised between 20 mm and 100 mm. According to an exemplary embodiment of the invention, the first material has a hardness comprised between 10 and 40 shore A measured according to ISO 868 or DIN 53505, and a thickness comprised between 30 mm and 60 mm.

Such a die 10 also comprises a second layer 12 of a second material that is, for example, a high-temperature vulcanizing (HTV) silicone, for example, one of Thermosil and Ultrasil silicones.

This second layer will be referred to hereinafter as the printing layer 12. For example, the hardness of the printing layer 12 is greater than 50 shore A measured according to ISO 868 or DIN 53505 and its thickness is less than 5 mm. Advantageously, the second material has a hardness comprised between 50 and 95 shore A measured according to ISO 868 or DIN 53505, and a thickness comprised between 1 mm and 5 mm. According to an exemplary and advantageous embodiment of the invention, the second material has a hardness comprised between 60 and 90 shore A measured according to ISO 868 or DIN 53505, and a thickness comprised between 1 mm and 3 mm.

This printing layer 12 is intended to be in contact with a print carrier.

Figure 2:
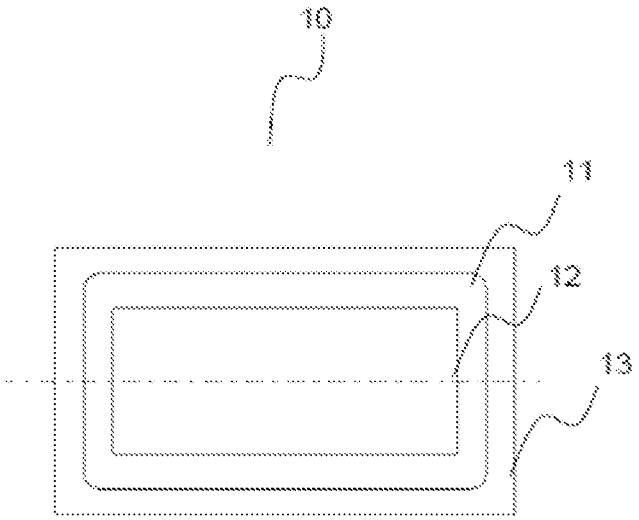
FIG. 2 is a top view of the die.
Figure 3:
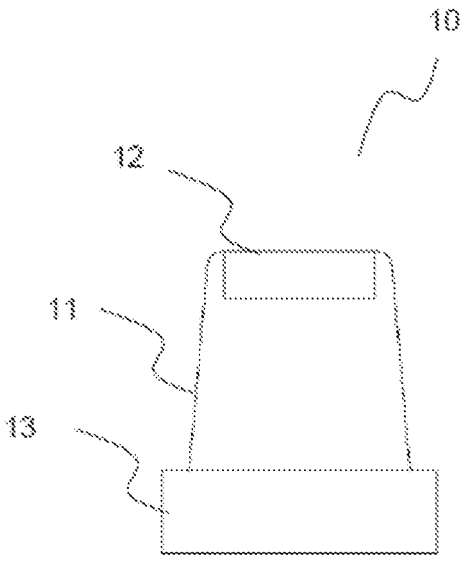
FIG. 3 is a side view of the die.

FIG. 2 is a top view of the die 10 and FIG. 3 is a side view of the die 10.

The colors of the first and second materials can be chosen by adding colorants without changing the mechanical properties of these materials.

According to an exemplary embodiment of the invention, the printing layer must be heated to a temperature comprised between 100° C. and 200° C., for example to 160° C. The printing layer can be heated, for example, by radiation.

It can also be heated by contact, by placing the pad on a hot surface such as a metal block heated by a heating resistor.

The advantage of this die according to the invention is that it can retain the heat required for hot stamping in the working area (printing layer), while enabling it to adapt to objects with complex shapes and facilitating the application of the carrier.

The difference with a typical die with a metal base layer and a silicone printing layer is that the first material used in the present application is more flexible than hot stamping silicones (minimum 40 shore A measured according to ISO 868 or DIN 53505). Moreover, pad printing silicone is not thermally conductive, which enables the temperature to be maintained at the surface of the pad.

The die 10 is designed to be installed, for example, on a hot stamping machine that has a print carrier and on which one or more object(s) to be stamped are installed for stamping.

Advantageously, the die 10 also comprises a mounting bracket 13 for attachment to the hot stamping machine, for example made of dural. Of course, the mounting bracket may be made of any other material. For example, it may be made of steel.

A person skilled in the art will be aware that several variants of the aforementioned embodiments are conceivable without departing from the scope of the invention.

The invention claimed is:

1. A die for printing through a print carrier onto an object in a hot stamping machine, the die comprising:

a base layer composed of a room-temperature vulcanizing (RTV) silicone having a hardness less than 50 shore A measured according to ISO 868 or DIN 53505, the base layer having a thickness greater than 20 mm;

a printing layer composed of a second material having a hardness greater than 50 shore A measured according to ISO 868 or DIN 53505, the printing layer having a thickness less than 5 mm and configured to contact the print carrier; and a mounting bracket for attachment to the hot stamping machine, the mounting bracket composed of dural.

2. The die according to claim 1, wherein the hardness of the RTV silicone is between 10 and 40 shore A measured according to ISO 868 or DIN 53505, and the thickness of the base layer is between 30 mm and 60 mm.

3. The die according to claim 1, wherein the hardness of the second material is between 60 and 90 shore A measured according to ISO 868 or DIN 53505, and the thickness of the printing layer is between 1 mm and 3 mm.

4. The die according to claim 1, wherein the second material is a high-temperature vulcanizing (HTV) silicone.

5. The die according to claim 1, wherein the RTV silicone of the base layer is a two-component silicone elastomer which cures at room temperature by a polyaddition reaction.

6. The die according to claim 1, wherein the printing layer is configured to be heated by radiation or by contact with a hot surface.

7. The die according to claim 1, wherein the base layer extends from the mounting bracket to a distal end of the base layer, and the printing layer is secured on the base layer at the distal end.

8. A hot stamping machine comprising the die according to claim 1.

9. The hot stamping machine according to claim 8, further comprising the print carrier configured to couple to one or more objects to be stamped.

* * * * *